United States Patent
Waters et al.

(10) Patent No.: US 10,643,204 B2
(45) Date of Patent: *May 5, 2020

(54) CRYPTOGRAPHY METHOD AND SYSTEM FOR SECURING DATA VIA ELECTRONIC TRANSMISSION

(71) Applicants: Thomas J. Waters, St. Petersburg, FL (US); Richard H. Waters, Knoxville, TN (US); Robert N. Barrett, St. Petersburg, FL (US)

(72) Inventors: Thomas J. Waters, St. Petersburg, FL (US); Richard H. Waters, Knoxville, TN (US); Robert N. Barrett, St. Petersburg, FL (US)

(73) Assignees: Thomas J. Waters, St. Petersburg, FL (US); Richard H. Waters, Knoxville, TN (US); Robert N. Barrett, St. Petersburg, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/383,985

(22) Filed: Apr. 15, 2019

(65) Prior Publication Data

US 2019/0244198 A1     Aug. 8, 2019

Related U.S. Application Data

(63) Continuation-in-part of application No. 15/588,192, filed on May 5, 2017, now Pat. No. 10,263,785.

(60) Provisional application No. 62/332,589, filed on May 6, 2016.

(51) Int. Cl.
| | |
|---|---|
| H04L 29/06 | (2006.01) |
| G06Q 20/38 | (2012.01) |
| G06K 19/06 | (2006.01) |
| H04L 9/08 | (2006.01) |
| G06F 16/182 | (2019.01) |
| H04L 9/32 | (2006.01) |
| G06F 21/60 | (2013.01) |

(52) U.S. Cl.
CPC ..... *G06Q 20/3829* (2013.01); *G06F 16/1824* (2019.01); *G06F 21/602* (2013.01); *G06K 19/06037* (2013.01); *H04L 9/083* (2013.01); *H04L 9/0825* (2013.01); *H04L 9/0869* (2013.01); *H04L 9/3239* (2013.01); *H04L 63/0407* (2013.01); *H04L 2209/38* (2013.01); *H04L 2463/081* (2013.01)

(58) Field of Classification Search
CPC ..... G06F 21/10; G06F 21/6218; H04L 63/20; H04L 9/3247; H04L 9/0656; H04L 9/0869

See application file for complete search history.

(56) References Cited

U.S. PATENT DOCUMENTS

| | | |
|---|---|---|
| 1,310,719 A | 7/1919 | Vernam |
| 8,578,473 B2 | 11/2013 | Sadler |
| 9,054,871 B2 | 6/2015 | Horstmeyer et al. |
| 2008/0214300 A1 | 9/2008 | Williams et al. |
| 2014/0192981 A1 | 7/2014 | Hiwatari et al. |

*Primary Examiner* — Dao Q Ho
(74) *Attorney, Agent, or Firm* — Shumaker, Loop & Kendrick, LLP

(57) ABSTRACT

Provided are QR Codes configured with a Transactional Cryptopgrahy ("TC") component and methods for using thereof in a secure manner without the need for specialized hardware. By using software-defined security, QR codes can be used for a wider array of purposes without the additional expense and maintenance of separate hardware platforms for secure information.

19 Claims, 8 Drawing Sheets

200

HELLO.   HOW  ARE  YOU?
1  14 77 12  6  4   9  12 36  15 19 81 11  44 62 18  5  84 90

FIG. 6A

3QNPI#HELLO.   HOW  ARE  YOU?BD$TCXZ
10 23 77 94 8 63  1  14 77 12 6 4  9  12 36 15 19 81 11 44 62 18 5 84 90  2  88 51 17 72 40 33

FIG. 6B

CRYPTOGRAPHY METHOD AND SYSTEM FOR SECURING DATA VIA ELECTRONIC TRANSMISSION

TECHNICAL FIELD

The present invention relates to methods and systems for securing data via electronic transaction, and more particularly, for securing data in transit or stored data while providing a degree of anonymity to the communicants using multiple layers of encryption and Discreet Key Exchange methodology. The invention further relates to a method for using QR Codes to provide a software-based method for securing information without the need for specialized hardware, which can be further incorporated into smart packaging, anti-counterfeiting measures, fraud prevention, and e-commerce transactions.

BACKGROUND OF THE INVENTION

Electronic data is typically secured using 'open' encryption. The current 'open' encryption standard is Public Key Infrastructure (PKI), which is built around two critical components:
1. Key-Pairs A key-pair set is a pair of keys (an encryption key and a decryption key) that are mathematically bound to each other. Key-pair sets are most easily understood by comparing them to the electronic equivalent of a physical lock and key. The "Encryption Key" is like the lock—it is what makes the encrypted information secure from viewing by unauthorized parties. The "Decryption Key" is like a physical key, it allows you to open the lock and retrieve what is inside the package.

2. Public Storage of One Key

The "Encryption Key" (the digital 'lock') is stored in a public place, where anyone can pick it up and use it. This makes it easily available to all—akin to taking a physical lock off a shelf to secure an outside door. But in the digital realm, this availability/openness exposes and potentially renders vulnerable part of the security that is critical for secure communication between parties.

In an overly simplified example of this in action, a user places information (email, e-commerce transaction, medical data transfer, wearables device data, etc.) into a box and secures it by retrieving the lock ("Encryption Key") from a publicly available repository. Then he sends the locked box to the end user who uses his key ("Decryption Key") to unlock the box and retrieve the information.

In reality, this process is far more complicated, but can be explained with the following algebraic equation:

Consider (AB) as the first user's key-pair: "A" is the lock and "B" is the key.
Consider (YZ) as the second user's key-pair: "Y" is the lock and "Z" is the key.
Both users have published their locks (A & Y) to a public repository so others can communicate with them securely.
The following are all true:

$$A \neq B \neq Y \neq Z \quad \frac{AB}{YZ} \neq 1 \quad \frac{BY}{AZ} = 1$$

Then mathematically the following is also true:

$$\frac{BY}{AZ}(\text{Data}) = (\text{Data})$$

The above equation shows the computation of the package (Data), illustrating its transition from one user to another.
The steps would occur this way:
1. Combine the first user's private key (B) and the second user's publicly available "lock" (Y) with the information to be sent (Data). This creates a locked package that is sent to the end user.

BY(Data)

2. The end user takes the received package and applies its own private key (Z) and the first user's public key (A) retrieved from the repository.

$$\frac{BY(\text{Data})}{AZ}$$

3. After applying the missing pieces (AZ) to the received package (BY(Data)) then the original data is revealed.

The "Public Key" allows anyone to lock data in a way that only the recipient will be able to unlock. This feature is both a strength and weakness. It allows the locking piece to be used by anyone that wants to communicate securely. However, because it is publicly available, it also makes reverse engineering of the algorithm time consuming, but not impossible. If, one wants to derive another's private key, he can simply reverse engineer it with enough time and processor power. Given both, one may eventually extract (Z) from (BY(DATA))/A, since the public key ("A") and data package (BY(Data)) are online for an infinite period of time. The solution to the above problems is to never share or publicly post a key-pair, or to have the key-pair changed for each and every transaction that is encrypted.

QR (Quick Response) Codes were invented by Toyota Automotive Company's parts division, the Denso Corporation, to solve the problems of limited information that can be transmitted on conventional (aka, 'zebra striped') generic bar codes. Barcodes are machine-readable optical labels that provide information about the item to which they are attached. The QR code expanded beyond the automotive industry and soon grew into other purposes, including rewards programs and digital coupons.

Current uses for QR codes include supply chain, inventory management, and shipping information. In Asia they are frequently used for payment information without the need for Western credit card platforms. Services including Alipay and WeChat Pay utilize QR codes to facilitate transactions at fast food restaurants, convenience stores, and popular retailers.

Unlike Western payment systems, QR Code readers are relatively inexpensive, putting them within easy reach of vegetable sellers and foot cart vendors in rural areas and developing countries. Rather than using credit card based platforms these readers can read QR codes from consumer smartphones efficiently and inexpensively.

Already widespread in China, QR codes are increasingly common in Japan, Korea, and spreading quickly to other parts of Asia. While acceptance in the U.S. and Europe has been slow, the technology is quickly morphing as more and more transactions are taking place (1) digitally, and (2) via mobile devices, particularly smartphones.

In markets such as Singapore and Hong Kong, consumers still typically use credit cards for transactions at restaurants or shops. While contactless chip-based technology upgrades have made credit card use faster, they still take longer than QR code transactions. The time savings add up quickly when there are many consumers trying to use transactional system at the same time, as is commonly seen at train stations, bus depots, concert halls, and athletic stadiums, among other places.

QR codes have grown so popular in China, transactions surpassed $5.8 trillion in the first quarter of 2018—they are so ubiquitous, beggars often use QR codes because few people carry cash anymore.

As an internal tracking mechanism, QR codes are an ideal solution. However, problems exist with the use of QR codes on a grand scale. In particular, when QR codes are used on a grand scale outside the bounds of the "internal controls" of a strictly internal system, data within the QR code may be easily compromised. For example, QR Codes are being used across the internet for many sensitive transactions (including financial and privacy related), which renders the data within these QR codes susceptible to potential misuse/abuse and/or wherein information within these QR codes may be easily compromised and/or intercepted by third parties. Therefore, what is needed is a method to secure and safeguard these communications (e.g., data with QR codes) at the transactional level.

BRIEF SUMMARY

Therefore, it is an objective of the present invention to provide methods and systems that avoid and/or reduce the risk of the above mentioned problems and to provide further solutions directed to enhancing security of QR codes especially when used on a grand scale and/or during sensitive transactions. It should be noted that in contrast to the above discussed PKI, Transactional Cryptography ("TC") disclosed herein uses multiple layers of encryption and a Discreet Key Exchange methodology to safely deliver the highest level of communications security available. TC uses asymmetrical key-pair sets to create unique, one-time keys for the encryption process. However, the "Encryption Key" (e.g. the "lock" part) is not stored publicly. Instead of a long-lived, single key-pair set, TC generates a single-use set of key-pairs (a lock and key combination) for the communication transaction to use one time, and one time only, and then discard. Key distribution is handled through a method called Discreet Key Exchange ("DKE"). DKE methodology holds each asymmetrical key separately and yet intrinsically linked together.

Transactional Cryptography disclosed herein utilizes Vernam's ideals (disclosed in U.S. Pat. No. 1,310,719), with the added complexity of (new) asymmetrical keys, and combines it with a (new) secure discreet key exchange process.

When a user ("Originator") wants to send data to another user ("Receiver"), a request to a trusted, third-party ("Repository"—a liaison that is a service that acts as a go-between and/or liaises between the two end points and/or two users) is made. The Repository creates a Transactional Identifier and generates two new key-pairs. As shown in FIG. 1, Repository sends the Transactional Identifier and the encryption key (lock "A") to the Originator. This concept may be further adapted for use with QR codes. For example, inclusion of TC with QR Codes will enable for a secure communications channel to be created prior to the exchange of any personally sensitive information. When a user (Originator) scans a QR Code, the embedded link will make a Request to a trusted, third-party ("Repository"). The Repository creates a Transactional identifier and generates two new key-pairs. Again as shown in FIG. 1, Repository sends the Transactional Identifier and the encryption key (lock "A") to the Originator.

Then the Repository sends the Transactional Identifier and the decryption key (key "Z") to the Receiver as shown in FIG. 2.

The Originator uses the encryption key (lock "A") to encrypt the data, and then adds the encrypted data with the Transactional Identifier together to form a package and sends it to the Repository. The Repository recognizes the Transactional Identifier then adds both the Transactional Identifier and the Originator's decryption key (key "B") to the encrypted data then encrypts this new package with the Receiver's encryption key (lock "Y") and sends it to the Receiver.

The Receiver recognizes the Transactional Identifier and uses the associated decryption key (key "Z") to open the package. The Receiver verifies the Transactional Identifier inside the encrypted package matches with the one from the outside of the encrypted package, then decrypts the data inside the package with Originator's decryption key (key "B"). Receiver now has the data from the Originator.

Further authentication of data integrity is performed each time the package is handed to the next party by generating a hash of the data provided and comparing the generated hash with a hash value sent by the previous party.

In this methodology, the "Repository" is a trusted third-party to the communication—this can be a physical third-party (e.g. VeriSign, PayPal, DocuSign, etc.) or a service running on one of the user's domains (e.g. an Active Directory service). Implementation of TC can be used in numerous environments and in many different embodiments including both software and hardware. The two strongest points to one-time use encryption keys are that:

(1) The encrypted message never falls into a repetitive (predictable) pattern, and
(2) The encrypted message will have a uniform frequency distribution (of characters).

In certain aspects, the key pairs disclosed herein can be generated by an independent system(s)/hardware and communicated via the repository to the Originator and/or Recipient.

Because every letter in a message encrypted in this manner is equally likely to occur, there is no mathematical way to determine a letter's prevalence. A single letter can be a single replacement letter, or it could be any assigned number running well into the multiple trillions. The message itself doesn't care, and a computer with the corresponding key can easily decrypt it at the other end.

The random pairing of each character in the message further strengthens the encryption because no letter ever re-uses a previously used pairing. Encrypting the word 'wood' results in different key pairs for each use of the letter 'o'. Looking at the encrypted word, an intercepting agent would not know the decrypted word contains two identical letters beside each other because their key-pairs are different.

Furthermore, the spaces between individual words are similarly paired in a one-time-key manner each and every time they occur. This prevents an intercepting agent from determining the length of each individual word and how many times that word occurs in the message. Such information helps so-called 'brute-force' decryption by identifying qualifiers and set up words in intercepted communications.

An additional security measure will add random strings of extraneous characters to a message—the beginning, middle, or end—to mask the size and purpose of the message. The encryption algorithm can be designed to recognize these strings of characters are purely for 'padding' purposes to mask the true content and length of the encrypted file, ignoring them completely when the message is properly decrypted.

The encryption algorithm can be further secured by being set to automatically delete itself upon being properly decrypted. Like SnapChat and similar social media, the encryption can self-destruct, leaving the decrypted message in its original state while leaving no digital forensics for an intercepting agent to try and reconstruct.

Thus, based on the above description, disclosed is a method and system for securing various data packages through an electronic transaction. This technology employs various methods of securing the data in transit and may provide anonymity to the data for end use consumption and archiving. A user may pass data securely to a recipient by way of a trusted third party acting as a security provider. This security provider supplies a method of discreet key exchange and creates a separation between the two communicants that introduces a level of anonymity for both parties. When the user desires to transmit data securely, the user will provide the data and the recipient's contact information to the security provider by way of a specific software program/service/hardware provided by the security provider (herein simply called the "widget"). The widget will request a transaction record be created along with two, single-use key-pairs that will are linked together for this specific communication. The security provider sends part of each key-pair to either end of the communication along with a transaction identifier. The widget at each end of the communication will use its key to either encrypt or decrypt the originator's data (respectively). This method provides an in depth method of protection through multiple layers of encryption powered by unique, single-use keys.

Specifically disclosed is a method for encrypting data utilizing a data encryption server, including the steps of: registering, with the server, a data originator; creating, by the server, a data originator encryption key and a corresponding recipient encryption key, the data originator encryption key and the recipient encryption key being a randomly-generated asymmetrical key-pair set configured for one-time use and not otherwise publicly stored; transmitting, by the server, the data originator encryption key to a data originator peripheral device and the recipient encryption key to a recipient peripheral device; encrypting data to be transmitted by the data originator peripheral device with the data originator encryption key; transmitting the encrypted data to the recipient peripheral device; verifying that the recipient encryption key and the data originator encryption key are from the same randomly-generated key-pair set; and if the recipient encryption key and the data originator encryption key are verified to be from the same randomly-generated key-pair set, decrypting the encrypted data received by the recipient peripheral device.

In certain aspects, wherein the randomly-generated key-pair set is utilized for a single data transmission between the data originator peripheral device and the recipient peripheral device and discarded after (e.g., immediately after) decryption of the transmitted data.

In certain aspects, the data to be transmitted is a message, global positioning systems (GPS) data, and/or financial data, and each character and/or space of the message, global positioning systems (GPS) data, and/or financial data is assigned a randomly-generated character. The randomly-generated character may be a number or symbol. In preferred aspects, the randomly generated character is a number.

In certain aspects, the randomly-generated character is not repeated.

In further aspects, additional randomly-generated intermittently randomly dispersed characters that do not correspond to the data to be transmitted are further provided to further mask/conceal the nature and size of the data to transmitted to the recipient peripheral device.

In certain aspects, the additional randomly-generated intermittently randomly dispersed characters are not repeated. The additional randomly-generated intermittently randomly dispersed character may be a number or symbol. In preferred aspects, the randomly-generated intermittently randomly dispersed character is a number.

In certain aspects, the encrypted data has a unique file extension. The unique file extension includes at least one of an .epub file, a .zip file, or a .tkp file.

In certain aspects, the method further includes tracking the encrypted data via blockchain technology.

Also disclosed herein are systems for implementing the disclosed methods. Specifically disclosed is a system for encrypting data including at least a first and second peripheral device; a data encryption server; and a network router; wherein the first peripheral device is a data originator and is configured to register with the encryption server; the encryption server is configured to concurrently create a data originator encryption key and a corresponding recipient encryption key once the first peripheral device registers with the encryption server, the data originator encryption key and the recipient encryption key being a randomly-generated asymmetrical key-pair set configured for one-time use and not otherwise publicly stored; the encryption server is further configured to transmit the data originator encryption key to the first peripheral device and the recipient encryption key to the second peripheral device, which is a recipient peripheral device; the encryption server is configured to encrypt data to be transmitted by the data originator peripheral device with the data originator encryption key and transmit the encrypted data to the recipient peripheral device; at least one of the first peripheral device, the second peripheral device, and/or encryption server are configured to verify that the recipient encryption key and the data originator encryption key are from the same randomly-generated key-pair set; and if the recipient encryption key and the data originator encryption key are verified to be from the same randomly-generated key-pair set, decrypting the encrypted data received by the recipient peripheral device.

In other aspects, the data to be transmitted with the system is a message, global positioning systems (GPS) data, and/or financial data, and certain ones of characters and/or spaced of the message global positioning systems (GPS) data, and/or financial data are assigned a randomly-generated character. The randomly-generated character may be a number or symbol. In preferred aspects, the randomly generated character is a number.

In certain aspects, the randomly-generated character is not repeated.

In further aspects, additional randomly-generated intermittently randomly dispersed characters that do not correspond to the data to be transmitted are further provided to further mask/conceal the nature and size of the data to transmitted to the recipient peripheral device.

In certain aspects, the additional randomly-generated intermittently randomly dispersed characters are not repeated. The additional randomly-generated intermittently randomly dispersed character may be a number or symbol. In preferred aspects, the randomly-generated intermittently randomly dispersed character is a number.

In certain aspects, the encrypted data has a unique file extension. The unique file extension includes at least one of an .epub file, a .zip file, or a .tkp file.

In certain aspects, the method further includes tracking the encrypted data via blockchain technology.

Embodiments of the invention can include one or more or any combination of the above features and configurations.

In certain aspect disclosed is a method for encrypting data within a QR code utilizing a data encryption server, including the steps of: registering, with the server, a data originator; creating, by the server, a data originator encryption key and a corresponding recipient encryption key, the data originator encryption key and the recipient encryption key being a randomly-generated asymmetrical key-pair set configured for one-time use and not otherwise publicly stored; transmitting, by the server, the data originator encryption key to a data originator peripheral device and the recipient encryption key to a recipient peripheral device; encrypting data within the QR code to be transmitted by the data originator peripheral device with the data originator encryption key; transmitting the encrypted data within the QR code to the recipient peripheral device; verifying that the recipient encryption key and the data originator encryption key are from the same randomly-generated key-pair set; and if/when the recipient encryption key and the data originator encryption key are verified to be from the same randomly-generated key-pair set, decrypting the encrypted data within the QR code received by the recipient peripheral device such that information within the QR code is accessible and may be viewed/read.

Also disclosed is a system for encrypting data within a QR code, including (a) at least a first and second peripheral device; (b) a data encryption server; (c) and a network router allowing for communication of an encrypted QR code between the first peripheral device, second peripheral device, and data encryption server; wherein: the first peripheral device is a data originator and is configured to communicate with and register with the encryption server; the encryption server is configured to concurrently create a data originator encryption key and a corresponding recipient encryption key once the first peripheral device registers with the encryption server, the data originator encryption key and the recipient encryption key being a randomly-generated asymmetrical key-pair set configured for one-time use and not otherwise publicly stored; the encryption server is further configured to transmit the data originator encryption key to the first peripheral device and the recipient encryption key to the second peripheral device, which is a recipient peripheral device; the encryption server is configured to encrypt data within the QR code that is to be transmitted by the data originator peripheral device with the data originator encryption key and transmit the encrypted data within the QR code to the recipient peripheral device; at least one of the first peripheral device, the second peripheral device, and/or encryption server are configured to verify that the recipient encryption key and the data originator encryption key are from the same randomly-generated key-pair set; and if the recipient encryption key and the data originator encryption key are verified to be from the same randomly-generated key-pair set, decrypting the encrypted data within the QR code received by the recipient peripheral device such that information within the QR code is accessible and may be viewed/read.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which:

FIG. 6A depicts the decryption methods disclosed herein in which randomly-generated character, which are not repeated, correspond to the data desired to be sent to the recipient;

FIG. 6B further depicts randomly-generated intermittently randomly dispersed characters that do not correspond to the data to be transmitted are further provided to further mask/conceal the nature and size of the data to transmitted to the recipient peripheral device;

DETAILED DESCRIPTION

Figure 1:
FIG. 1 depicts the Transactional Identifier and the encryption key (lock "A") sent from the Repository to the Originator.
Figure 2:
FIG. 2 depicts the Transactional Identifier and the decryption key (key "Z") sent from the Repository to the Receiver.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. It will be understood that like or analogous elements and/or components, referred to herein, may be identified throughout the drawings with like reference characters. It will be further understood that several of the figures are merely schematic representations of the present technology. As such some of the components may have been distorted from their actual scale for pictorial clarity.

As defined herein, an "Originator" (e.g., a first peripheral device and/or an originator's peripheral device) may be any entity who attempts to send data (e.g., an encrypted QR code) electronically.

A "Receiver" (e.g., a second peripheral device and/or a recipient's peripheral device) may be the end-point of electronic transaction that receives the data electronically.

A "security provider" may be an entity, device, or service that provides the defined services disclosed herein.

A "key-pair" is a set of encryption keys that are intrinsically tied together but function separately and are generally referred to as the encryption key and the decryption key.

The present invention is described below with reference to block diagrams and operational illustrations of methods, systems, and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently. The invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Generally, in terms of hardware architecture for the electronic devices disclosed below, computing device includes a processor, a memory, and one or more input and/or output (I/O) devices (or peripherals) that are communicatively coupled via a local interface. Local interface may be one or more buses or other wired or wireless connections, as is known in the art. Local interface may have additional elements, which are omitted for simplicity, such as controllers, buffers (caches), drivers, transmitters, and receivers to facilitate external communications with other like or dissimilar computing devices. Further, local interface may include address, control, and/or data connections to enable internal communications among the other computer components.

The processor is a hardware device for executing software, particularly software stored in memory. The processor can be any custom made or commercially available processor, such as, for example, a Core series or vPro processor made by Intel Corporation, or a Phenom, Athlon or Sempron processor made by Advanced Micro Devices, Inc. In the case where computing device is a server, the processor may be, for example, a Xeon or Itanium processor from Intel, or an Opteron-series processor from Advanced Micro Devices, Inc. Processor may also represent multiple parallel or distributed processors working in unison. Processor may also represent multiple processors located in a plurality of computing devices working in parallel, unison, or serial effort to achieve the disclosed methods.

Memory can include any one or a combination of volatile memory elements (e.g., random access memory (RAM, such as DRAM, SRAM, SDRAM, etc.)) and nonvolatile memory elements (e.g., ROM, hard drive, flash drive, CDROM, etc.). It may incorporate electronic magnetic, optical, and/or other types of storage media. Memory can have a distributed architecture where various components are situated remote from one another, but are still accessed by processor. These other components may reside on devices located elsewhere on a network or in a cloud arrangement.

The software in memory may include one or more separate programs. The separate programs comprise ordered listings of executable instructions for implementing logical functions. The software in memory may include the system in accordance with the invention, and a suitable operating system (O/S). Examples of suitable commercially available operating systems are Windows operating systems available from Microsoft Corporation, Mac OS X available from Apple Computer, Inc., a Unix operating system from AT&T, or a Unix-derivative such as BSD or Linux. The operating system O/S will depend on the type of computing device. For example, if the computing device is a PDA or handheld computer (e.g., smartphone), the operating system may be iOS for operating certain devices from Apple Computer, Inc., PalmOS for devices from Palm Computing, Inc., Windows Phone 8 from Microsoft Corporation, Android from Google, Inc., or Symbian from Nokia Corporation. Operating system essentially controls the execution of other computer programs, such as the system, and provides scheduling, input-output control, file and data management, memory management, and communication control and related services.

If computing device is a PC compatible computer, Apple® computer, a handheld device, or the like, the software in memory may further include a basic input output system (BIOS). The BIOS is a set of essential software routines that initialize and test hardware at startup, start operating system, and support the transfer of data among the hardware devices. The BIOS is stored in ROM so that the BIOS can be executed when computing device is activated.

Steps and/or elements, and/or portions thereof of the invention may be implemented using a source program, executable program (object code), script, or any other entity comprising a set of instructions to be performed. Furthermore, the software embodying the invention can be written as (a) an object oriented programming language, which has classes of data and methods, or (b) a procedural programming language, which has routines, subroutines, and/or functions, for example but not limited to, C, C++, C#, Pascal, Basic, Fortran, Cobol, Perl, Java, Ada, Python, Swift, and Lua.

I/O device may include input devices such as a keyboard, a mouse, a scanner, a microphone, a touch screen, a bar code reader, or an infra-red reader. It may also include output devices such as a printer, a video display, an audio speaker or headphone port or a projector. I/O device may also comprise devices that communicate with inputs or outputs, such as a short-range transceiver (RFID, Bluetooth, etc.), a telephonic interface, a cellular communication port, a router, or other types of network communication equipment. I/O device may be internal to computing device, or may be external and connected wirelessly or via connection cable, such as through a universal serial bus port. In certain aspects, hardware-based encryption devices may be used with the systems and methods disclosed herein, which include capacitive touch screen devices, Apple Pencil, authenticated signature or voice, tablet, phone, PDA, IoT, wearable tech, ICS/SCADA, and medical devices.

When the computing device is in operation, processor is configured to execute software stored within memory, to communicate data to and from memory, and to generally control operations of computing device pursuant to the software. The system and operating system, in whole or in part, may be read by processor, buffered within processor, and then executed.

In the context of this document, a "computer-readable medium" may be any means that can store, communicate, propagate, or transport data objects for use by or in connection with the system. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. The system can be embodied in any type of computer-readable medium for use by or in connection with an instruction execution system or apparatus, such as a computer.

For purposes of connecting to other computing devices, computing device is equipped with network communication equipment and circuitry. In a preferred embodiment, the network communication equipment includes a network card such as an Ethernet card, or a wireless connection card. In a preferred network environment, each of the plurality of computing devices on the network is configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while a preferred embodiment of the invention is for each computing device to have a broadband or wireless connection to the Internet (such as DSL, Cable, Wireless, T-1, T-3, OC3 or satellite, etc.), the principles of the invention are also practicable with a dialup connection through a standard modem or other connection means. Wireless network connections are also contemplated, such as wireless Ethernet, satellite, infrared, radio frequency, Bluetooth, near field communication, and cellular networks. In certain aspects, standalone systems not requiring connectivity to other systems are also contemplated.

According to various embodiments, the disclosed systems and methods may employ various information technology devices and/or services (networks, computers, servers, networking devices, private and public clod services etc.) that may: (1) authenticate the Originator's account, (2) authenticate the Recipient's account, (3) generate single-use encryption key-pairs, (4) encrypt and/or decrypt data, (5) transmit and receive data packets, (6) store transactional data to ensure proper recordkeeping for integrity and non-repudiation, and (7) employ various verification devices (CRC, file hashing, etc.) to ensure data integrity through the transaction.

Figure 3:
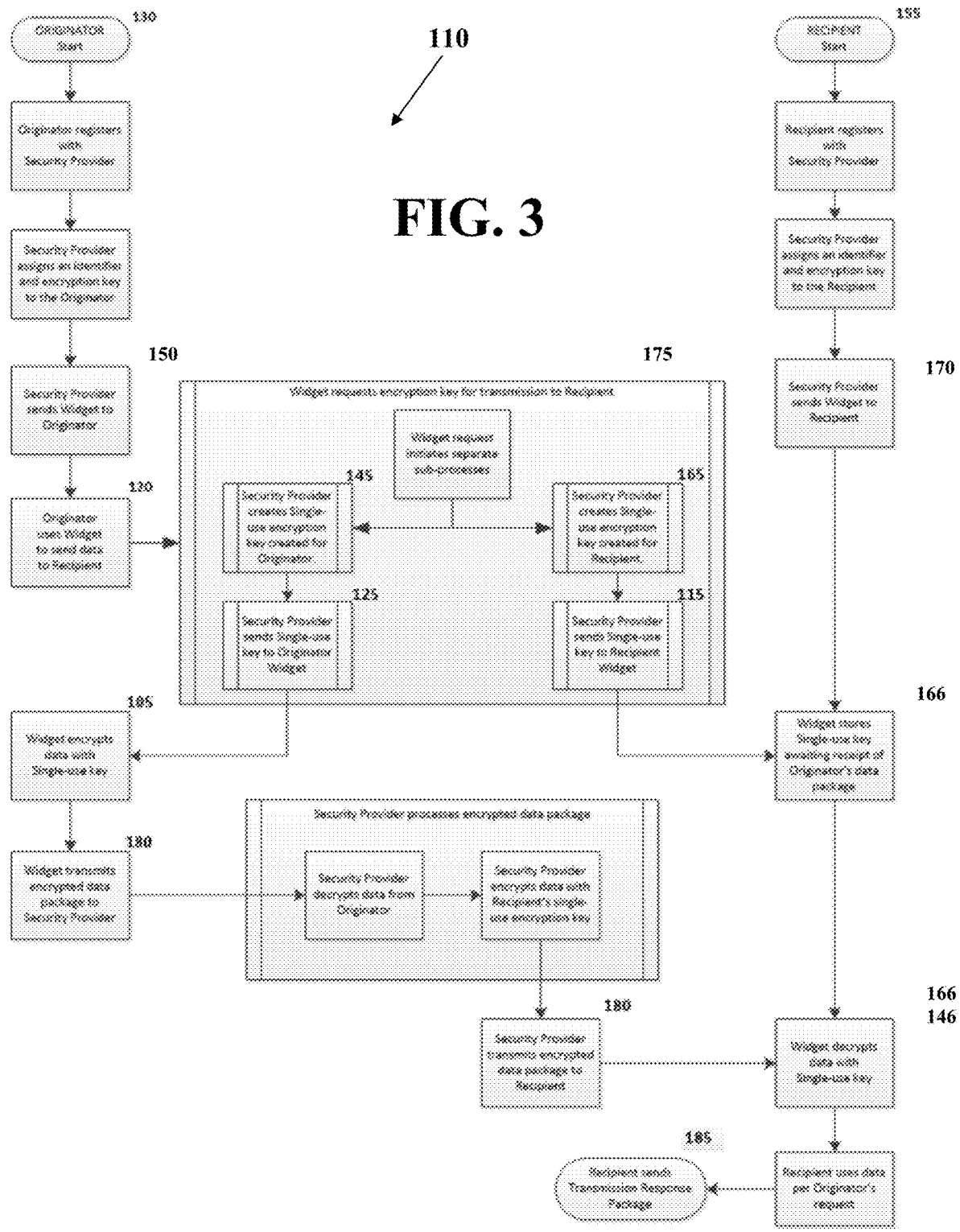
FIG. 3 depicts a general data flow chart of the disclosed systems and methods.
Figure 4:
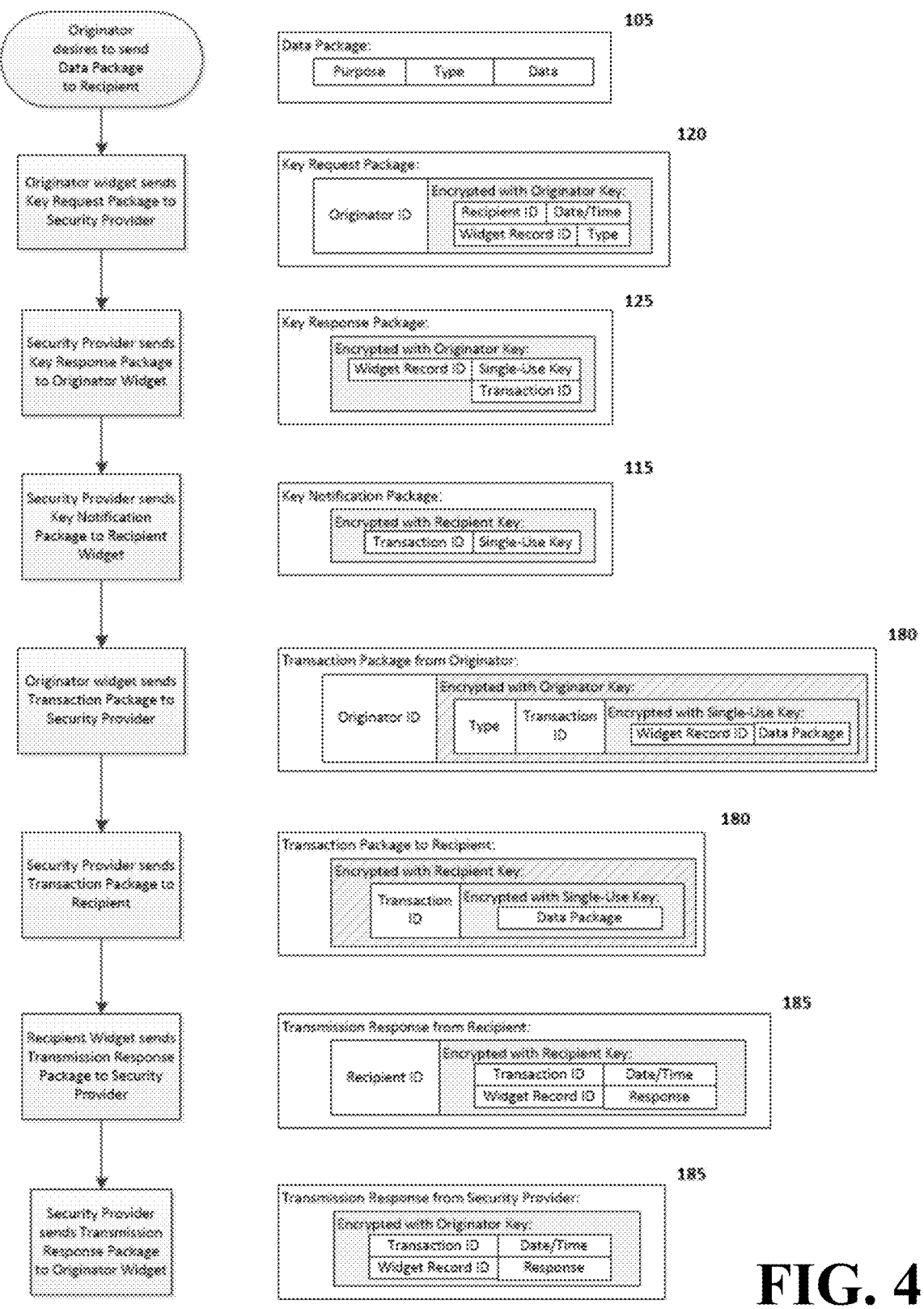
FIG. 4 depicts an exemplary process flow further disclosing encryption and data encapsulation that occurring temporally during the disclosed method(s).

The disclosed systems and methods will now be further described in view of FIGS. 3 and 4. Specifically, FIGS. 3 and 4 are schematic diagrams depicting general process flows of the disclosed methods and systems.

Figure 9:
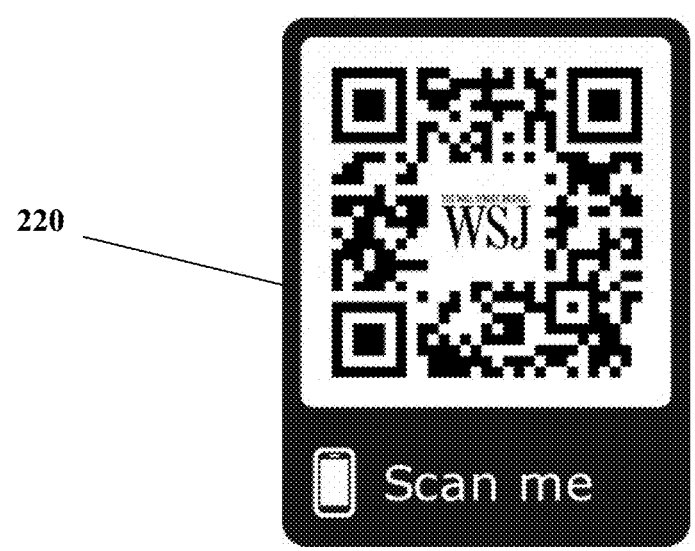
FIG. 9 is a QR code (encrypted QR code) featuring a brand logo, as well as an instructional frame around the code to direct consumers as to specific actions to take.

The originator 130 may desire to send data 100 (e.g., a QR code 200, 210 and/or an encrypted QR code 220 as shown in FIG. 9) from originator's device to a recipient 155 (i.e., recipient's device). Originator 130 registers with the security provider 175 and receives a widget 150 to process data transmissions securely (e.g., to decrypt encrypted QR code (s)). (The widget is preferably a stand-alone portable application installed and executed on web pages, to offer site visitors enhanced functionality from a third party.)

Originator's widget 150 encrypts a key request package 120 with the originator's encryption key 140. The widget 150 transmits the key request package 120 to the security provider 175. The security provider 175 validates originator's account and decrypts the key request package 120 with the originator's encryption key 140. The security provider 175 records identifying information about this particular transaction including the recipient identification, and creates a transaction ID 190 to identify this specific communication transaction. Then the security provider 175 generates a single-use key-pair 145 for the originator. The security provider 175 then generates a single-use key-pair 145 for the recipient.

The security provider 175 places the originator's single-use encryption key 145 and the transaction ID 190 into a package and secures it with the originator's encryption key 140 and transmits the key response package 125 back to the originator's widget 150. The originator's widget 150 decrypts the key response package 125 and records the transaction ID 190 and the single-use encryption key 145.

The security provider 175 packages the recipient's single-use decryption key 165 and transaction ID 190 with the recipient's encryption key 160 and transmits the key notification package 115 to the recipient's widget 170. The recipient's widget 170 decrypts the key notification package 115 and records the transaction ID 190 and the recipient's single-use key-pair 165.

Originator's data 100 and the transaction ID 190 are encrypted with the originator's single-use encryption key 145 to create a data package 105. Originator's widget 150 encrypts the data package 105 (e.g., an encrypted QR code 220 as shown in FIG. 9) with the originator's encryption key 140 to create the transmission package 180. Originator's widget 150 sends the encrypted transmission package 180 to the security provider 175.

The security provider 175 validates originator's account and decrypts the transmission package 180 (e.g., decrypting the encrypted QR code 220 as shown in FIG. 9) with the originator's encryption key 140. The security provider 175 then appends the transaction ID 190 and the originator's single-use decryption key 146 to the originator's secured data package 105 with the recipient's single-use encryption key 165 to create a new data package 105.

The security provider 175 encrypts the new data package 105 with the recipient's encryption key 160 to create a new transmission package 180. The security provider 175 sends the encrypted transmission package 180 (e.g., decrypting the encrypted QR code 220 as shown in FIG. 9) to the recipient's widget 170.

The recipient's widget 170 decrypts the transmission package 180 (e.g., decrypting the encrypted QR code 220 as shown in FIG. 9) with the recipient's encryption key 160. Recipient's widget 170 uses the transaction ID 190 to retrieve the stored single-use decryption key 166. Recipient's widget 170 then uses the recipient's single-use decryption key 166 to decrypt the data package 105. Recipient's widget 170 then uses the originator's single-use decryption key 146 to decrypt the original data package 105 (e.g., a decrypted QR code). Recipient processes data 100 as desired by the originator and sends a transaction response back to the security provider 175. Security provider 175 sends transaction response 185 back to the originator 130.

Figure 5:
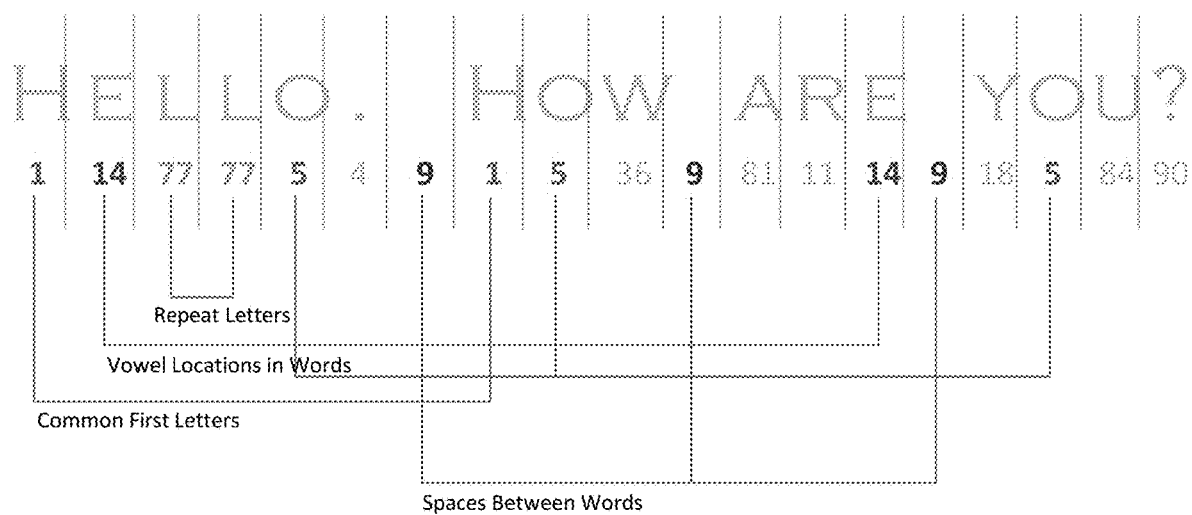
FIG. 5 schematically depicts known decryption methods.

FIG. 5 schematically depicts known decryption methods with known systems. In contrast to FIG. 5, FIGS. 6A and 6B provide schematic depictions of the disclosed encryption methods (and systems implementing these methods). Specifically, FIG. 6A depicts the decryption methods disclosed herein in which randomly-generated character, which are not repeated, correspond to the data desired to be sent to the recipient. FIG. 6B further depicts randomly-generated intermittently dispersed characters that do not correspond to the data to be transmitted are further provided to further mask/conceal the nature and size of the data to transmitted to the recipient peripheral device.

Figure 7:
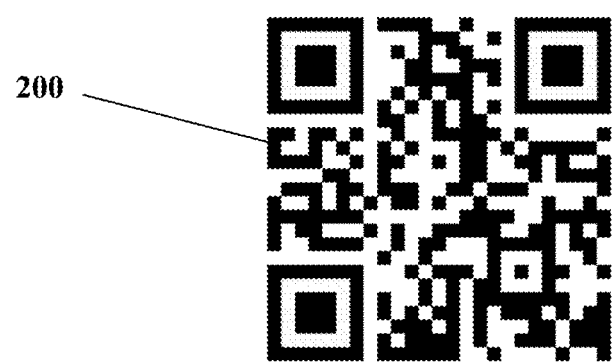
FIG. 7 is a conventional QR code, which opens up the website to, for example, *The Wall Street Journal;*
Figure 8:
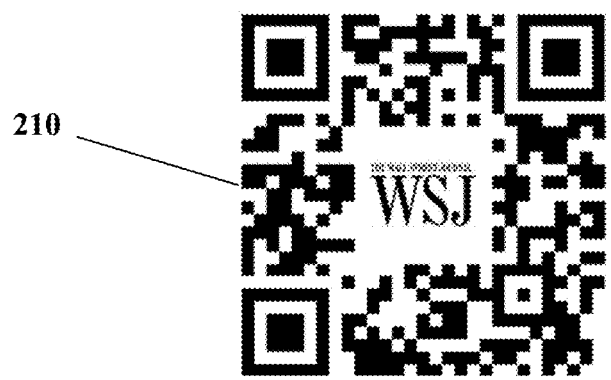
FIG. 8 is a QR code featuring a logo for branding or other identification purposes.

The above mentioned Transactional Cryptography ("TC") methods and systems can be further applied to QR codes to provide an added level of security to transactions and more particularly sensitive transactions that utilize QR codes. Referring specifically to FIGS. 7 and 8, FIG. 7 is a conventional QR code 200, which opens up a predetermined website/URL to, for example, *The Wall Street Journal*, and FIG. 8 is a QR code 210 that opens a website/URL and features indicia (e.g., logo) further identifying the website/URL featuring a logo for branding or other identification purposes. FIG. 9 is a QR code 220 (encrypted QR code) featuring a brand logo, as well as an instructional frame around the code to direct consumers as to specific actions to take.

Referring to FIGS. 7 and 8, a QR code 200, 210 may be included and/or seen on any type of packaging or consumer material. In certain aspects, the QR Codes 200, 210, 220 provide a much larger amount of data to be shared with a user through a camera-enabled device like a smartphone. Referring to FIG. 8, QR Codes 210 can also be fitted with logos, images, or even color schemes as desired by the code's creator to provide further specificity, identification, and/or security. For example, QR Code 200 provides a much larger amount of content to be transmitted to a consumer through a camera-enabled device like a smartphone. QR Codes 210 can also incorporate a logo (e.g., "WSJ" for *The Wall Street Journal*) or other image(s) to provide additional information that is meant to be seen by human eyes. In this case, a brand logo clarifying the company the QR Code 210 will further link to the desired URL/website.

In addition to the above, QR codes 220 (encrypted QR code) can also include a logo showing that the QR Code transaction is secured via Transactional Cryptography ("TC") can be included herein using the systems and methods discussed above and in FIGS. 1-6B to provide the user with additional assurances of the transaction remaining securely communicated to the appropriate company.

Specifically referring to FIG. 9, the QR Code 220 can also be 'framed', which can direct potential users to specific options, uses, or purposes of the Code. It can also direct them to specific types of readers that might be used—smartphones, medical devices, or more.

Tags
ID TAG
100 Data
105 Data Package QR code 200, 210 to be encrypted)
110 Environment
115 Key Notification Package
120 Key Request Package
125 Key Response Package
130 Originator
135 Originator Device (first peripheral device)
140 Originator Encryption Key
145 Originator Single-Use Encryption Key
146 Originator Single-Use Decryption Key
150 Originator Widget
155 Recipient
160 Recipient Encryption Key
165 Recipient Single-Use Encryption Key
166 Recipient Single-Use Decryption Key
170 Recipient Widget
175 Security Provider (data encryption server)
180 Transaction Package (e.g., encrypted QR code 220)
185 Transmission Response Package
190 Transaction ID
200 A QR code that opens a website/URL
210 A QR code that opens a website/URL and features indicia (e.g., logo) further identifying the website/URL
220 An encrypted QR code that opens a website/URL and features indicia (e.g., logo) further identifying the website/URL and that further incorporates a frame around the code to provide instructions on the code's use and purpose.

The foregoing description provides embodiments of the invention by way of example only. It is envisioned that other embodiments may perform similar functions and/or achieve similar results. Any and all such equivalent embodiments and examples are within the scope of the present invention.

What is claimed is:

1. A method for encrypting data within a QR code utilizing a data encryption server, comprising the steps of:
   registering, with the server, a data originator;
   creating, by the server, a data originator encryption key and a corresponding recipient encryption key, the data originator encryption key and the recipient encryption key being a randomly-generated asymmetrical key-pair set configured for one-time use and not otherwise publicly stored;
   transmitting, by the server, the data originator encryption key to a data originator peripheral device and the recipient encryption key to a recipient peripheral device;
   encrypting data within the QR code to be transmitted by the data originator peripheral device with the data originator encryption key;
   transmitting the encrypted data within the QR code to the recipient peripheral device;

verifying that the recipient encryption key and the data originator encryption key are from the same randomly-generated key-pair set; and when the recipient encryption key and the data originator encryption key are verified to be from the same randomly-generated key-pair set, decrypting the encrypted data within the QR code received by the recipient peripheral device such that information within the QR code is accessible and may be viewed/read, wherein the encrypted data has a unique file extension;

further comprising additional randomly-generated intermittently dispersed characters that do not correspond to the data to be transmitted is further provided to further mask the nature and size of the data to transmitted to the recipient peripheral device;

further comprising tracking the encrypted data via blockchain technology.

2. The method according to claim 1, wherein the randomly-generated key-pair set is utilized for a single data transmission between the data originator peripheral device and the recipient peripheral device and discarded after decryption of the transmitted data.

3. The method according to claim 2, wherein the data to be transmitted is a message and each character and/or space of the message is assigned a randomly-generated character.

4. The method according to claim 3, wherein the randomly-generated character is not repeated.

5. The method according to claim 4, further comprising additional randomly-generated intermittently dispersed characters that do not correspond to the data to be transmitted that further conceal the nature and size of the data to transmitted to the recipient peripheral device.

6. The method according to claim 5, wherein the additional randomly-generated intermittently dispersed characters are not repeated.

7. The method of claim 6, wherein the encrypted data has a unique file extension.

8. The method of claim 7, further comprising tracking the encrypted data via blockchain technology.

9. The method according to claim 2, wherein the data to be transmitted is a message and certain ones of characters and/or spaced of the message are assigned a randomly-generated character.

10. The method according to claim 9, wherein the randomly-generated character is not repeated.

11. The method according to claim 10, wherein the additional randomly-generated intermittently dispersed characters are not repeated.

12. The method of 3, wherein the assigned randomly-generated character is a number.

13. The method of 6, wherein the additional randomly-generated intermittently dispersed characters are number.

14. A system for encrypting data within a QR code, comprising:
(a) at least a first and second peripheral device;
(b) a data encryption server;
(c) and a network router allowing for communication of an encrypted QR code between the first peripheral device, the second peripheral device, and the data encryption server; wherein:

the first peripheral device is a data originator and is configured to communicate with and register with the encryption server;

the encryption server is configured to concurrently create a data originator encryption key and a corresponding recipient encryption key once the first peripheral device registers with the encryption server, the data originator encryption key and the recipient encryption key being a randomly-generated asymmetrical key-pair set configured for one-time use and not otherwise publicly stored;

the encryption server is further configured to transmit the data originator encryption key to the first peripheral device and the recipient encryption key to the second peripheral device, which is a recipient peripheral device;

the encryption server is configured to encrypt data within the QR code that is to be transmitted by the data originator peripheral device with the data originator encryption key and transmit the encrypted data within the QR code to the recipient peripheral device;

at least one of the first peripheral device, the second peripheral device, and/or encryption server are configured to verify that the recipient encryption key and the data originator encryption key are from the same randomly-generated key-pair set; and when the recipient encryption key and the data originator encryption key are verified to be from the same randomly-generated key-pair set, decrypting the encrypted data within the QR code received by the recipient peripheral device such that information within the QR code is accessible and may be viewed/read, wherein the encrypted data has a unique file extension;

further comprising additional randomly-generated intermittently dispersed characters that do not correspond to the data to be transmitted is further provided to further mask the nature and size of the data to transmitted to the recipient peripheral device;

further comprising tracking the encrypted data via blockchain technology.

15. The system according to claim 14, wherein the randomly-generated key-pair set is utilized for a single data transmission between the data originator peripheral device and the recipient peripheral device and discarded after decryption of the transmitted data.

16. The system according to claim 15, wherein the data to be transmitted is a message and each character and/or space of the message is assigned a randomly-generated character.

17. The system according to claim 16, wherein the randomly-generated character is not repeated.

18. The system according to claim 17, wherein the additional randomly-generated intermittently dispersed characters are not repeated.

19. The system of claim 18, wherein the unique file extension is at least one of an .epub file, a .zip file, or a .tkp file.

* * * * *